(No Model.)
T. M. FOOTE.
SECONDARY BATTERY.
No. 431,341. Patented July 1, 1890.
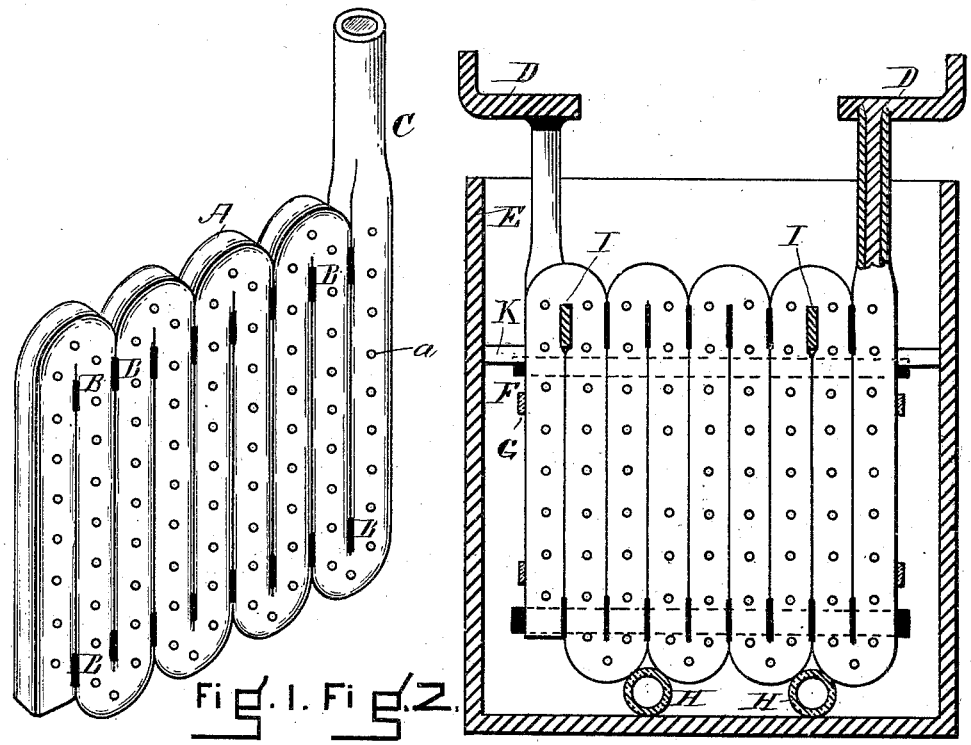
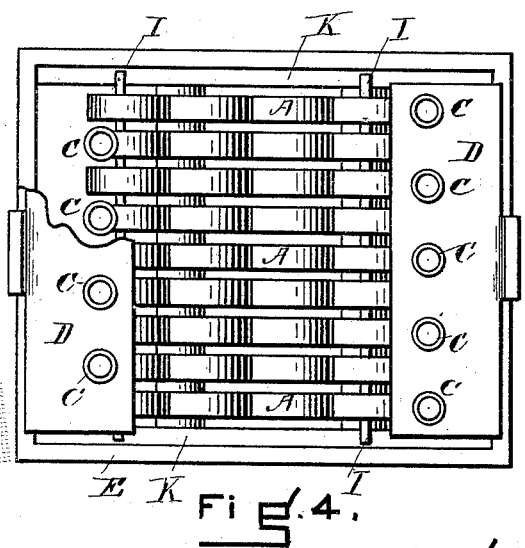
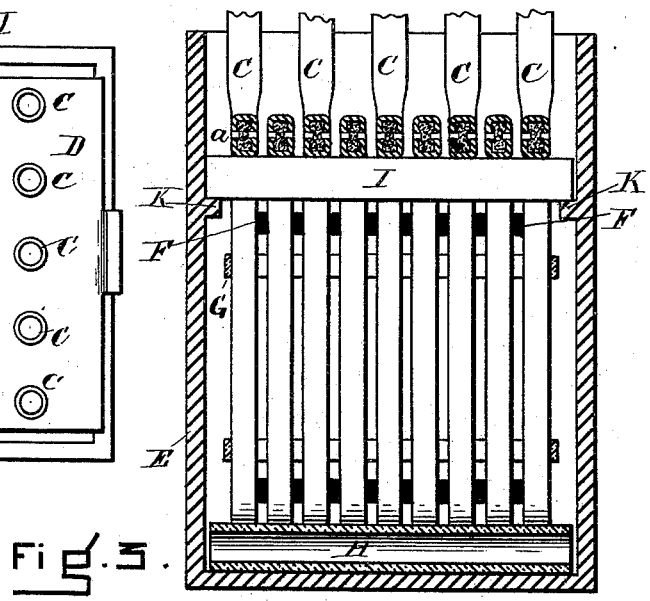
WITNESSES.
Frank G. Parker.
Matthew M. Blunt.
INVENTOR
Theodore M. Foote
by his attorney
Aug. L. Hayes.

UNITED STATES PATENT OFFICE.

THEODORE M. FOOTE, OF ALLSTON, ASSIGNOR OF ONE-HALF TO CHARLES J. PILLSBURY, OF BOSTON, MASSACHUSETTS.

SECONDARY BATTERY.

SPECIFICATION forming part of Letters Patent No. 431,341, dated July 1, 1890.

Application filed July 5, 1889. Serial No. 316,615. (No model.)

*To all whom it may concern:*

Be it known that I, THEODORE M. FOOTE, of Allston, in the county of Suffolk and State of Massachusetts, have invented a new and useful Improvement in Storage-Batteries, of which the following, taken in connection with the accompanying drawings, is a specification.

As storage-batteries are generally constructed the metallic oxides which are acted upon by the current in charging the battery are applied as a coating in the form of a paste to the surface of a metallic plate, for which lead has been used as the most suitable material, while the oxides which are used are those oxides of lead which are commercially known as "litharge" and as "minium." In order to secure the proper adherence of this coating to the lead plates, various devices have been adopted—as, for example, the formation in the plate of perforations in which the oxide is packed, the construction of the plate in the form of a grid, in the interstices of which the oxide is compressed, and the use of corrugated plates. Storage-batteries made in this manner have been extensively manufactured and used, and have been adopted in the various departments of electric engineering to such an extent as to demonstrate that if they can be constructed so as to be durable and reliable they have an important field of usefulness; but it has been found by experience that it is impossible to prevent fragments of the coating from becoming detached from the plates and injuring the cell by falling between adjacent plates and establishing a short circuit; and also that the cells are liable to become short-circuited by the bending outward or "buckling" of the plates, whereby adjacent plates are brought into contact. It has also been noticed that when the cells are used in vehicles or in railroad-cars the jolting to which the cells are subjected causes fragments of the coating to become detached from the plates and to fall between adjacent plates. For these reasons the life of a storage-battery is liable to be impaired and the battery is rendered unreliable and uncertain in action, so that these batteries have failed to realize the expectation of their inventors and manufacturers. Moreover, the method of constructing the plates, which has been found necessary in order to secure the proper adherence of the oxide of lead, increases the cost of the battery much above the cost of the materials used.

It is the object of my invention to obtain a storage-battery which will be free from the defects before stated and the cost of which will not much exceed the cost of the materials used, thus rendering the battery reliable, increasing its life, and reducing its first cost; and to this end the invention consists in an electrode for a storage-battery, substantially as hereinafter more fully set forth, which electrode is formed from a tube of lead or other suitable metal filled with a powder composed of the material which is acted upon by the charging-current, and is folded upon itself so as to form a flat plate, adjacent folds being burned together at points near the top and bottom of the plate, and perforations being made in the tube, through which perforations the electrolytic solution finds access to the powder in the tube.

The invention further consists in the manner of supporting the electrodes in the cell, substantially as hereinafter more fully set forth.

The accompanying drawings show various forms of electrodes constructed in this manner and a storage-battery made up of one form of these electrodes.

In the drawings, Figure 1 shows one form of electrode. Fig. 2 is a sectional view of a cell of a storage-battery having electrodes of this form. Fig. 3 is another sectional view of this cell. Fig. 4 is a plan view of the cell.

In the several figures the same letters refer to the same parts.

Referring to the drawings, A is the electrode. This is formed from a tube of lead, which is filled with litharge or minium in the form of a powder, litharge being preferably used for the positive electrode and minium for the negative electrode. This tube is then folded, so that what is in effect a plate is formed which comprises a series of vertical and adjacent compartments or cells. In order to bring these compartments near together it is preferable to compress or flatten the tube. The adjacent sections are united by burning at two points B B, one at the top of each section and the other at the bottom of the same. The sections are united at these points only, in order that the sections may be independent of each other, and any buckling or bending outward, which may be caused by the effect on the contents of the compartments of charging or discharging the cell, may be limited to each section, and therefore much reduce the possibility of this buckling of the electrode from being sufficient to cause the contact of adjacent electrodes, as would be more likely to be the case if the sections were united together throughout their whole length. I regard this as an important feature of my invention. It is obvious that it is not necessary for the action of the electrode that these sections should be united; but it is preferable that this should be the case. After the tube is filled, and preferably after it is compressed, a series of perforations $a$ are made on the sides of the tube from each side inward in such a manner that a burr or lip is formed around the edges of the perforation upon the inside of the tube, as shown in Fig. 3. These lips or burrs form compartments and act to retain the powder in position and prevent its escape through the perforations. These perforations may be formed by a suitable prick-punch, which presses through the walls of the tube and forms a roughened burr on the inside edge of the perforation. One end C of the tube projects above the folds, and to this projecting end is secured a bar of metal D, which connects alternate electrodes. To this bar the conducting-wire is attached, or by means of the bar the several cells are connected together. The electrodes are arranged so that there is a bar D on each side of the cell. The projecting end C of the tube is closed, and a preferable method of closing this end is by pouring molten lead into the tube, by which means the bar D is soldered to the tube. It is preferable to make this bar of lead. The method of constructing this electrode and this method of connecting the tubes to the bar forms the subject of another application for a patent of the United States filed by me August 8, 1889, Serial No. 320,109. It is obvious that this method of attaching the electrode to the connecting-bar D insures a perfect and solid connection and is easily and cheaply performed. I do not, however, limit myself to this manner of attaching the electrode to the connecting-bar, and any other suitable method may be adopted.

By reason of the compression to which the tubes are subjected they have a rectangular section. For various reasons tubes having this section may be found preferable to cylindrical tubes. I can give the tubes this form in any suitable manner, and I do not limit myself to forming cylindrical tubes by compression into tubes having a rectangular section.

E is the cell, which is made of earthenware, porcelain, glass, hard rubber, or any other suitable material for the cells of storage-batteries.

The electrodes are arranged side by side in the cell, alternate electrodes being connected to a bar D on each side of the cell, and the electrodes are separated from one another by transverse bars F, of hard rubber, or by any other suitable device. The electrodes are held together by encircling bands of rubber G, or in any other suitable manner.

Non-conducting supports—as, for example, glass rods or tubes H—may be used for supporting the electrodes in the cells, and the electrodes may also be suspended in the cell by bars I, of suitable non-conducting material, which pass through openings formed between the adjacent cells in the upper part of each electrode and rest upon ledges K, formed on the inside of the cell. The electrolytic solution comes into contact, by means of the perforations $a$, with the powder contained in the tube, so that when the cell is charged the oxide contained in the positive electrodes is converted into a peroxide, and the oxide contained in the negative electrode is reduced.

The number of perforations in the tube will be determined by the rate of discharge which is desired for the battery. The fewer the perforations the slower the discharge.

It will be seen that this construction avoids the possibility of any short-circuiting of the cell by the detachment of fragments of the coating from the plate, and also, as before explained, contact of adjacent plates due to buckling will not take place.

In efficiency and capacity this battery has been found to be equal, if not to surpass, any other form of storage-battery in which lead is used.

I do not limit myself to the use of lead tubes, as the electrodes may be formed of any other metal, and the tubes may be filled with any substance suitable for use in the construction of a storage-battery.

I am aware that an electrode for a storage-battery has been made which consists of two plates of metal united together at top and bottom and inclosing a metallic oxide in the form of a powder, and having perforations in the plate; but this electrode is liable to the objection of buckling, and, moreover, does not afford the amount of surface which is afforded by an electrode constructed according to the principle of my invention.

Having thus described my invention, what I claim, and desire to secure by Letters Patent of the United States, is—

1. In a storage-battery, an electrode, substantially as described, consisting of a tube of lead or other suitable metal filled with a powder composed of the material which is acted upon by the charging-current, provided with perforations upon its sides, folded vertically upon itself, and having adjacent folds united by "burning" at points near the top and bottom of each fold.

2. In a storage-battery, an electrode, substantially as described, consisting of a tube of lead or other suitable metal filled with a powder composed of the material which is acted upon by the charging-current, provided with perforations upon its sides, folded vertically upon itself, flattened by compression, and having adjacent folds united by burning at points near the top and bottom of each fold.

3. In a storage-battery, the combination, substantially as and for the purpose set forth, with the series of tubular electrodes, of two or more conducting-bars passing between the tubular electrodes and used for sustaining a position of the weight of the same, and openings made between the tubes forming the plates, through which openings the bars pass.

4. In a storage-battery, the combination, substantially as and for the purpose set forth, of a series of tubular electrodes, as described, non-conducting supports under the tubular electrodes, and non-conducting suspending bars passing through openings made between the tubes constituting the electrodes.

5. In a storage-battery, electrodes, substantially as described, having a tubular terminal which is united, by filling with molten lead, to a bar connecting the several terminals of the electrodes.

In testimony whereof I have signed my name to this specification in the presence of two subscribing witnesses.

THEODORE M. FOOTE.

Witnesses:
CHAS. J. PILLSBURY,
ALEX. L. HAYES.